(12) United States Patent
Kim et al.

(10) Patent No.: US 8,259,195 B2
(45) Date of Patent: Sep. 4, 2012

(54) CAMERA MODULE

(75) Inventors: Yong-Gu Kim, Seoul (KR); Sang-Jin Lee, Suwon-si (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 221 days.

(21) Appl. No.: 12/759,241

(22) Filed: Apr. 13, 2010

(65) Prior Publication Data

US 2011/0134306 A1    Jun. 9, 2011

(30) Foreign Application Priority Data

Dec. 4, 2009  (KR) .......................... 10-2009-0120038

(51) Int. Cl.
*H04N 5/262* (2006.01)

(52) U.S. Cl. .................... 348/240.99; 348/241; 348/373; 348/308

(58) Field of Classification Search ............. 348/240.99, 348/241, 373–376, 308
See application file for complete search history.

(56) References Cited

U.S. PATENT DOCUMENTS

2008/0094488 A1*  4/2008  Oishi et al. ............... 348/240.99
2009/0122426 A1*  5/2009  Cheng .......................... 359/819

FOREIGN PATENT DOCUMENTS

| KR | 10-0790681 | 1/2008 |
| KR | 10-0829982 | 5/2008 |

OTHER PUBLICATIONS

Korean Office Action, w/ partial English translation thereof, issued in Korean Patent Application No. KR 10-2009-0120038 dated Apr. 4, 2011.

* cited by examiner

*Primary Examiner* — Yogesh Aggarwal

(74) *Attorney, Agent, or Firm* — McDermott Will & Emery LLP

(57) ABSTRACT

A camera module is disclosed. In accordance with an embodiment of the present invention, the camera module includes a lens unit, an image sensing unit, which converts light received through the lens unit to an electrical signal, a housing, which supports the lens unit, and a shield can, which supports a lower side of the housing and is made of a conductive metallic material so as to shield an electromagnetic wave.

4 Claims, 11 Drawing Sheets

CAMERA MODULE

CROSS-REFERENCE TO RELATED APPLICATIONS

This application claims the benefit of Korean Patent Application No. 10-2009-0120038, filed with the Korean Intellectual Property Office on Dec. 4, 2009, the disclosure of which is incorporated herein by reference in its entirety.

BACKGROUND

1. Technical Field

The present invention is related to a camera module.

2. Description of the Related Art

In step with the recent trends toward smaller and thinner mobile devices, including mobile phones, there is a growing demand for reducing the size of components mounted on the mobile device. Together with making the mounted components smaller, high integration technologies are employed to provide improved functionalities of the mounted components.

Particularly, the camera module employed in the conventional mobile device is commonly employed in a camera phone, a PDA, a smart phone and a laptop computer. Accordingly, despite the compact size, the camera module needs to be equipped with a higher-performance photographing functionality to address various tastes of consumers.

Furthermore, in order to cope with the trends toward smaller electronic devices on which the camera module is mounted, the camera module needs to be smaller. At the same time, the camera module needs to be equipped with an electromagnetic shielding capability in order to protect circuit components inside the camera module.

SUMMARY

The present invention provides a camera module that can cope with spatial limitation.

An aspect of the present invention provides a camera module that includes a lens unit, an image sensing unit, which converts light received through the lens unit to an electrical signal, a housing, which supports the lens unit, and a shield can, which supports a lower side of the housing and is made of a conductive metallic material so as to shield an electromagnetic wave.

The shield can cover the image sensing unit. The camera module can further include a filter unit, which is interposed between the lens unit and the image sensing unit so as to shield infrared light.

The image sensing unit can include an image sensor, which converts light received through the lens unit to an electrical signal, and a substrate, which has the image sensor mounted thereon. The shield can be grounded to the substrate.

A downwardly-protruded fixing protrusion can be formed on a lower surface of the shield can, and a fixing indentation can be formed in the substrate, in which the fixing protrusion is inserted into the fixing indentation.

Additional aspects and advantages of the present invention will be set forth in part in the description which follows, and in part will be obvious from the description, or may be learned by practice of the invention.

DETAILED DESCRIPTION

Figure 1:
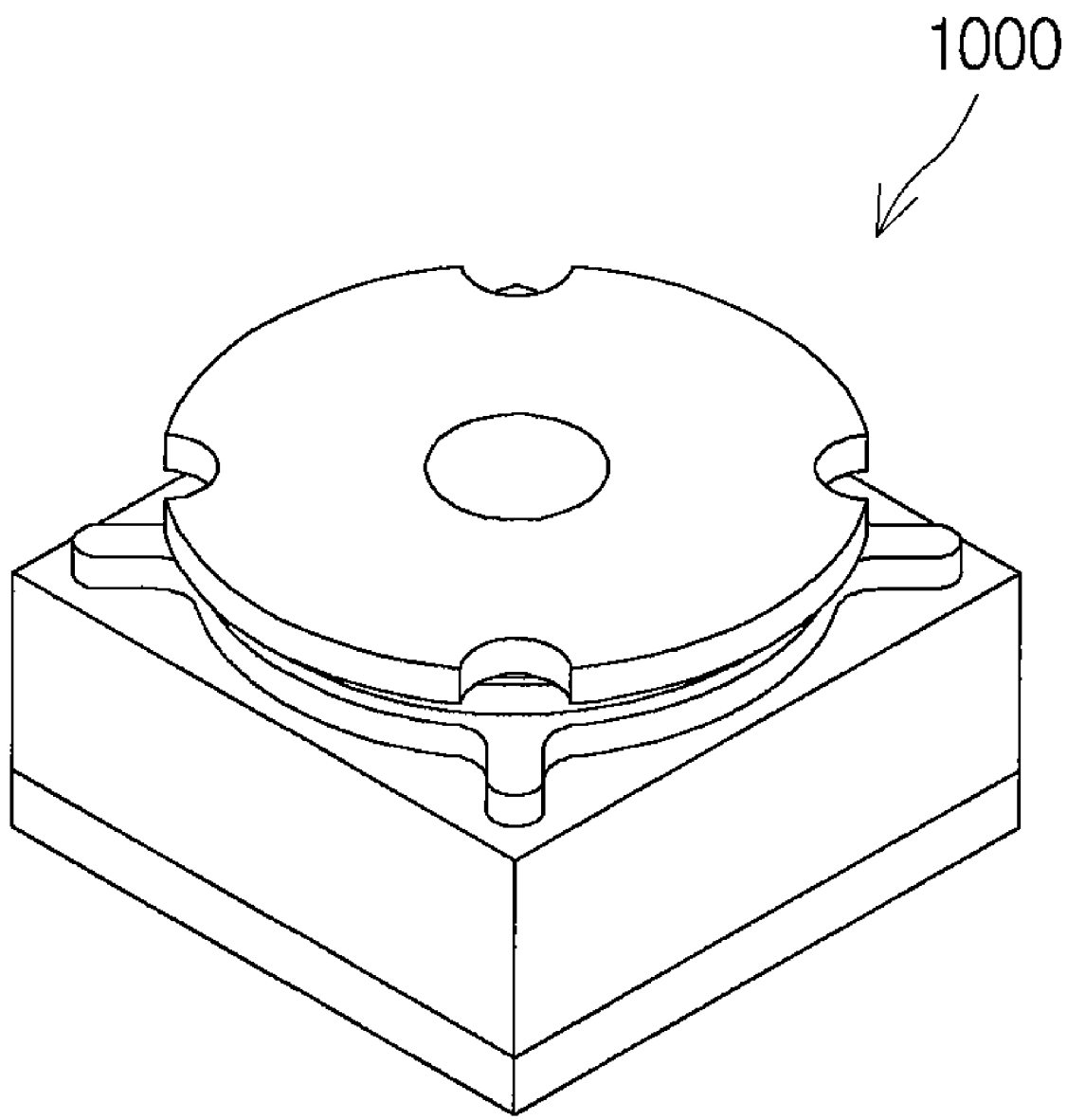
FIG. 1 is a perspective view of a camera module in accordance with an embodiment of the present invention.

The features and advantages of this invention will become apparent through the below drawings and description.

A camera module according to certain embodiments of the present invention will be described below in more detail with reference to the accompanying drawings. Those components that are the same or are in correspondence are rendered the same reference numeral regardless of the figure number, and redundant descriptions are omitted.

Figure 2:
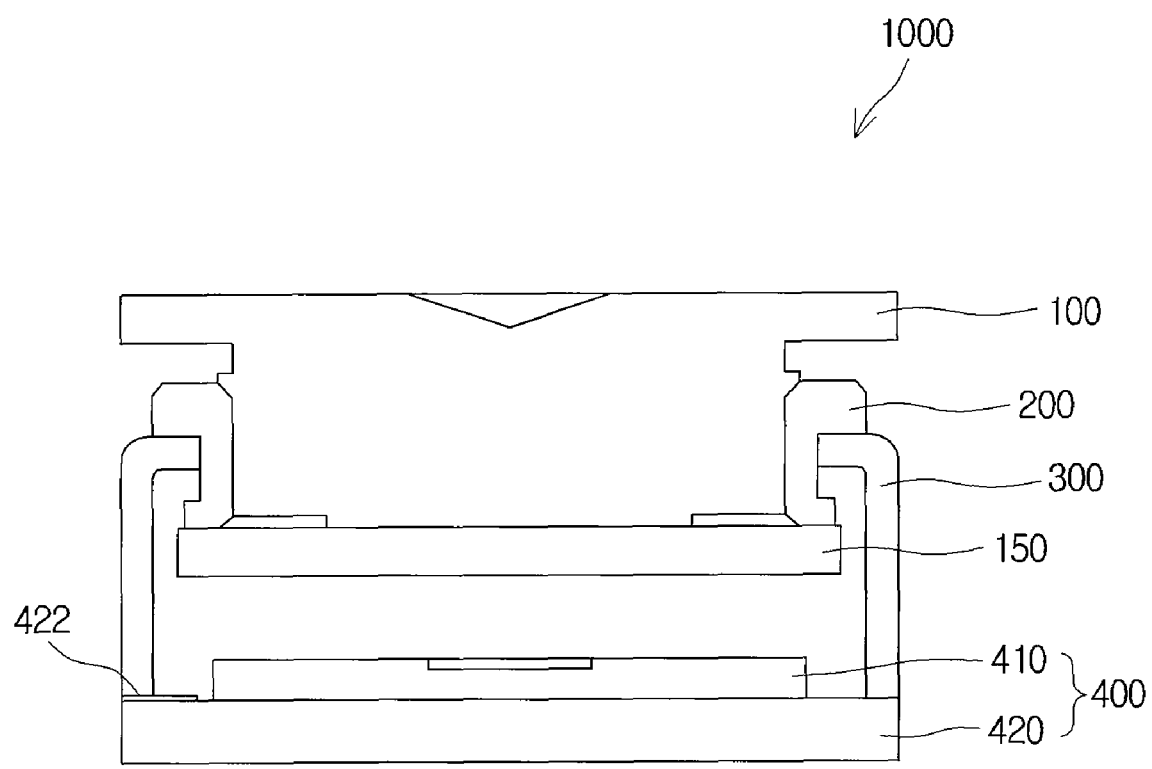
FIG. 2 is a cross-sectional view of a camera module in accordance with an embodiment of the present invention.

FIG. 1 is a perspective view of a camera module 1000 in accordance with an embodiment of the present invention, and FIG. 2 is a cross-sectional view of the camera module 1000 in accordance with an embodiment of the present invention. As illustrated in FIGS. 1 and 2, the camera module 1000 in accordance with an embodiment of the present invention includes a lens unit 100, a housing 200, an image sensing unit 400 and a shield can 300. With this configuration, a thinner camera module 1000 having an electromagnetic wave shielding structure can be provided.

The lens unit 100 can be an assembly of a lens and a barrel supporting the lens. The barrel can have a cylindrical shape, and an inner circumferential surface of the barrel can support the lens.

Figure 3:
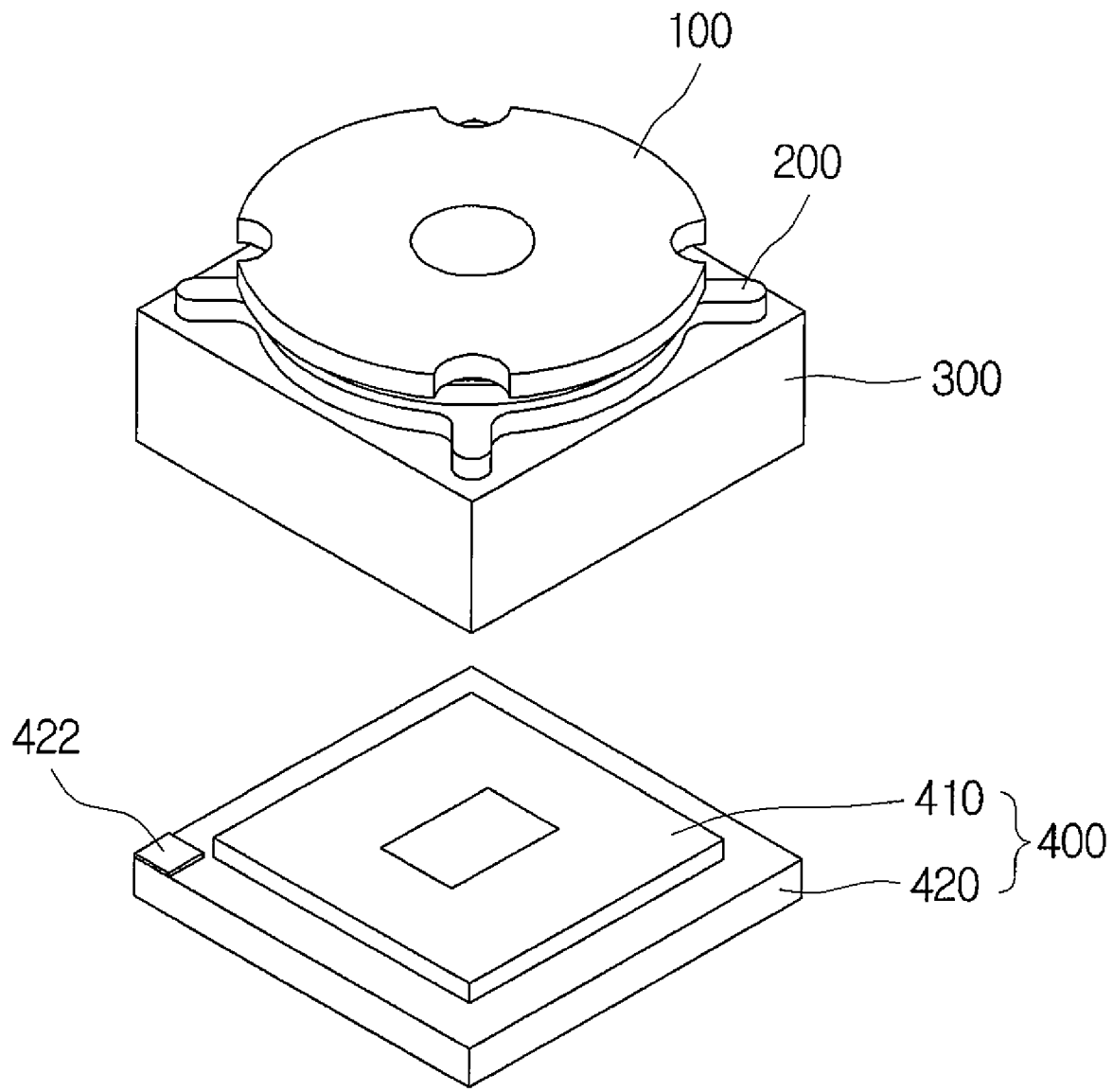
FIG. 3 is an exploded perspective view of a camera module in accordance with an embodiment of the present invention.

FIG. 3 is an exploded perspective view of the camera module 1000 in accordance with an embodiment of the present invention. As illustrated in FIG. 3, the image sensing unit 400 can include an image sensor 410 and a substrate 420.

The image sensor 410 can convert light received through the lens unit 100 to an electrical signal. The substrate 420 supports a lower surface of the image sensor 410 and can be electrically coupled to the image sensor 410 by way of wire bonding.

A ground pad 422 can be formed on an upper surface of the substrate 420. The ground pad 422 can be electrically coupled to a ground layer that is formed inside the substrate 420. The ground pad 422 can be in contact with a lower surface of the shield can 300, which will be described later, so that the ground pad 422 can be electrically coupled to the shield can 300. Accordingly, the electromagnetic wave shielding efficiency of the shield can 300 can be better improved.

Figure 4:
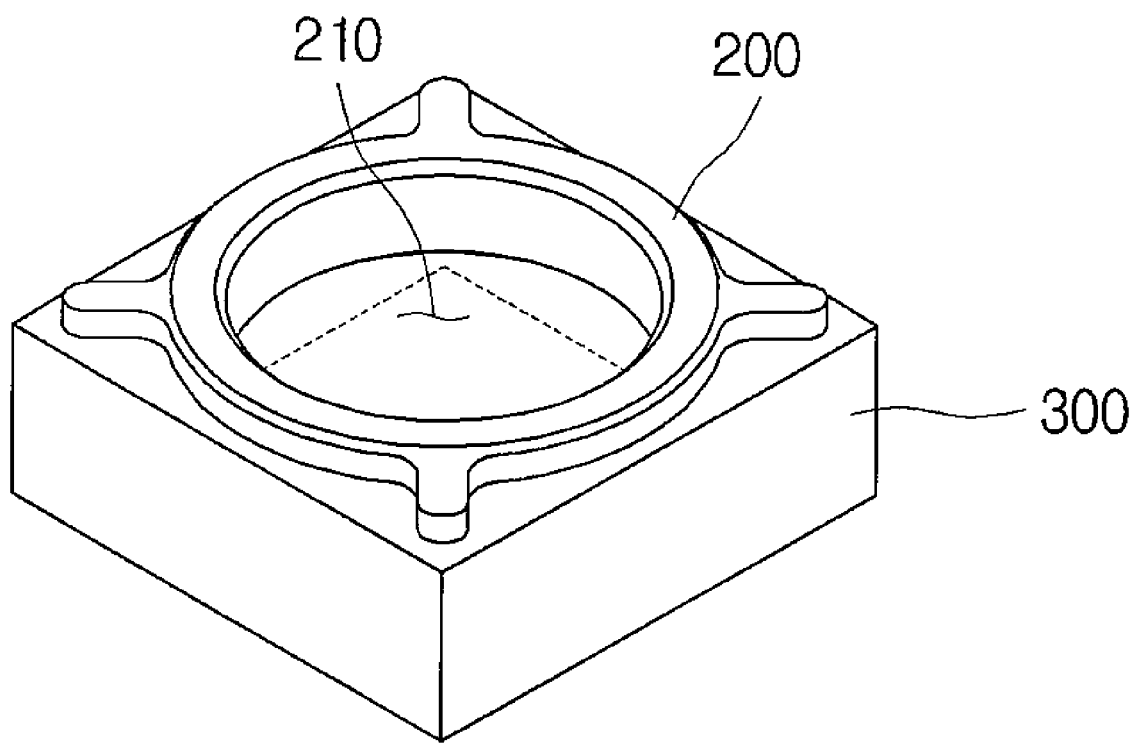
FIG. 4 is a perspective view illustrating an assembly of a housing and a shield can in a camera module in accordance with an embodiment of the present invention.
Figure 5:
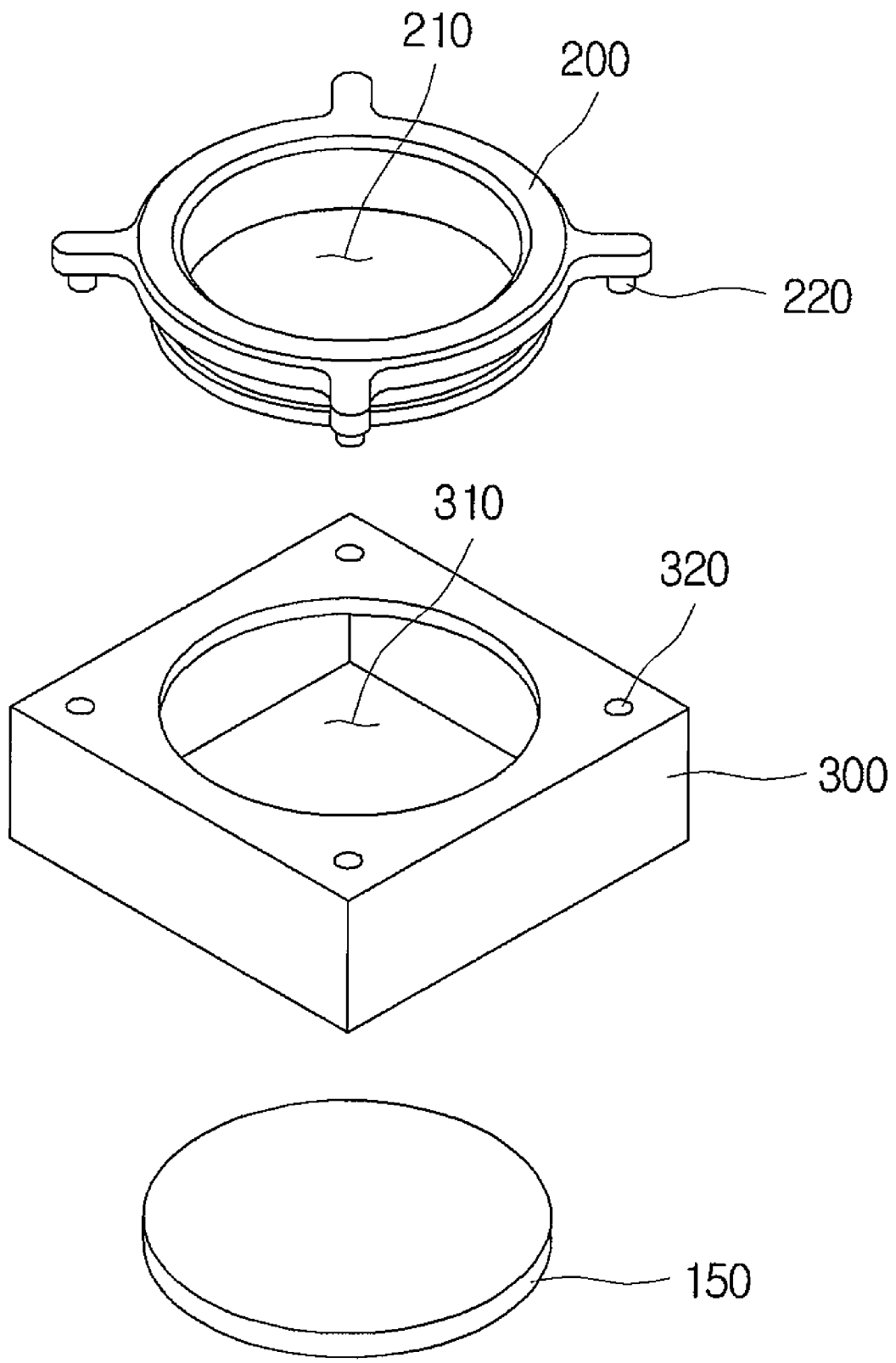
FIG. 5 is an exploded perspective view of a shield can, a housing and a filter unit in a camera module in accordance with an embodiment of the present invention.
Figure 6:
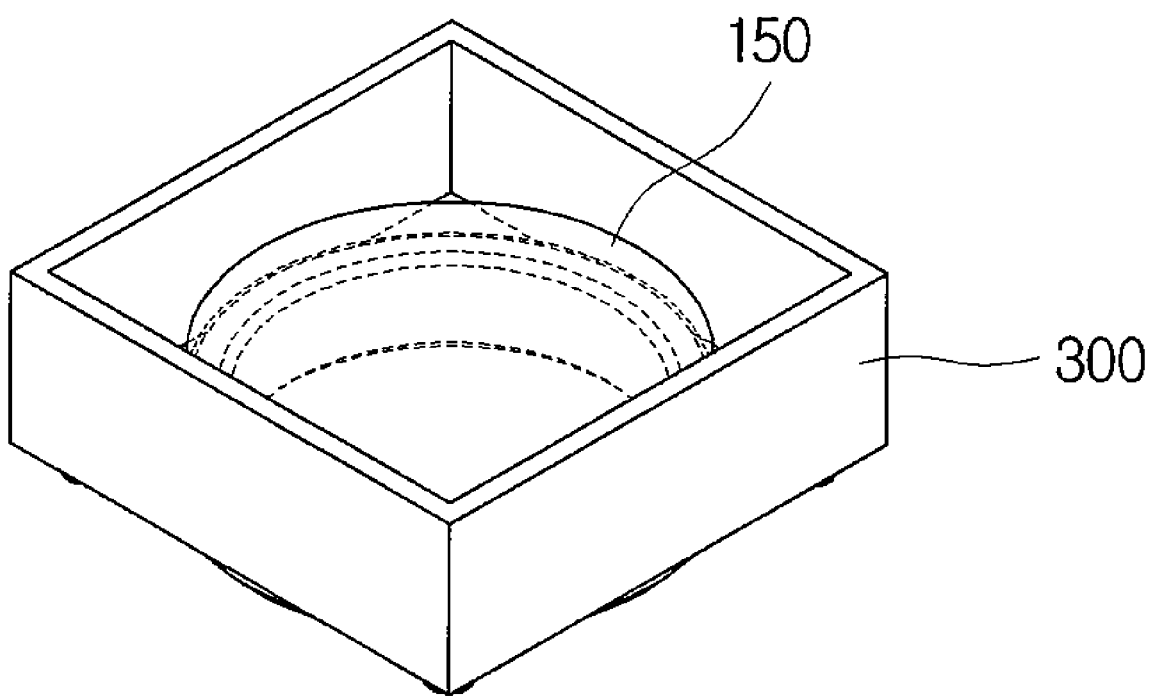
FIG. 6 is a perspective view illustrating a lower surface of an assembly of a housing and a shield can in a camera module in accordance with an embodiment of the present invention.

FIG. 4 is a perspective view illustrating an assembly of the housing 200 and the shield can 300 in the camera module 1000 in accordance with an embodiment of the present invention, and FIG. 5 is an exploded perspective view of the shield can 300, the housing 200 and a filter unit 150 in the camera module 1000 in accordance with an embodiment of the present invention. FIG. 6 is a perspective view illustrating a lower surface of an assembly of the housing 200 and the shield can 300 in the camera module 1000 in accordance with an embodiment of the present invention.

As illustrated in FIGS. 2, 4, 5 and 6, the housing 200 can support the lens unit 100. A circular-shaped through-hole 210 can be formed in an upper surface of the housing 200 to correspond to the outer shape of the barrel.

An inner circumferential surface of the through-hole 210 can be in contact with an outer circumferential surface of the lens unit 100 and support the lens unit 100. Here, a thread can be formed on the outer circumferential surface of the lens unit 100 and on the inner circumferential surface of the through-hole 210, and thus the threaded lens unit 100 and the threaded through-hole 210 can be coupled to each other. Accordingly, the lens unit 100 can be coupled to the housing 200 in such a way that the lens unit 100 is vertically movable with respect to the housing 200.

The housing 200 can have a generally cylinder-shaped form, and an upper portion of the housing 200 can be outwardly extended so that the housing 200 can be supported by an upper surface of the shield can 300. Then, a cylinder-shaped lower portion of the housing 200 can be inserted into a through-hole 310 of the shield can 300.

A downwardly-protruded insertion protrusion 220 can be formed on a lower surface of the outwardly-extended upper portion of the housing 200. There can be, for example, four insertion protrusions 220, which can be inserted into an insertion hole 320, which will be described later, of the shield can 300. With this configuration, the positional relationship between the housing 200 and the shield can 300 can be stabilized.

Therefore, the upper portion of the housing 200 is coupled to the upper surface of the shield can 300, and thus the shield can 300 can support the housing 200 entirely from the lower side of the housing 200.

Meanwhile, the through-hole 210, into which the lens unit 100 can be inserted, can be formed in the center of the upper surface of the housing 200.

The filter unit 150 can block infrared light and include, for example, an IR filter (infrared cut-off filter). The filter unit 150 can be interposed between the lens unit 100 and the image sensing unit 400 and coupled to inner surfaces of the shield can 300. Here, the filter unit 150 can be coupled to the inner surfaces of the shield can 300 by way of, for example, bonding or snug fitting.

By supporting the housing 200, the shield can 300 can support the lens unit 100. The upper surface of the shield can 300 can support an upper side of the housing 200. Here, by inserting the insertion protrusion 220 into the insertion hole 320, the lower surface of the housing 200 can be coupled to the upper surface of the shield can 300.

The shield can 300 can be vertically thicker than the housing 200. Accordingly, a lower end of the shield can 300, which supports a lower side of the housing 200, can be coupled to an upper surface of the substrate 420, and thus the shield can 300 can support the lens unit 100 above the image sensing unit 400. Thus, a thinner camera module 1000 can be provided.

Since the shield can 300 itself is made of a conductive metallic material, the shield can 300 can shield an electromagnetic wave. Here, in any other portions of the shield can 300 than the through-hole, into which the lens unit 100 is inserted, and the insertion hole 320, the shield can 300 does not have an opening that may be formed on one surface thereof or a seam that may be formed at the edge where two surfaces thereof meet. Therefore, the image sensing unit 400 can be completely sealed from the outside, thereby improving the efficiency of shielding the electromagnetic wave.

Therefore, by having the shield can 300 support the lower side of the housing 200, which supports the lens unit 100, inside the shield can 300, and having the lower end of the shield can 300 couple to the image sensing unit 400, a thinner type of camera module 1000 can be provided. At the same time, since the shield can 300 is grounded to the substrate 420 and made of a conductive metallic material that completely shields the image sensing unit 400, the electromagnetic wave shielding efficiency of the shield can 300 can be better improved.

Figure 7:
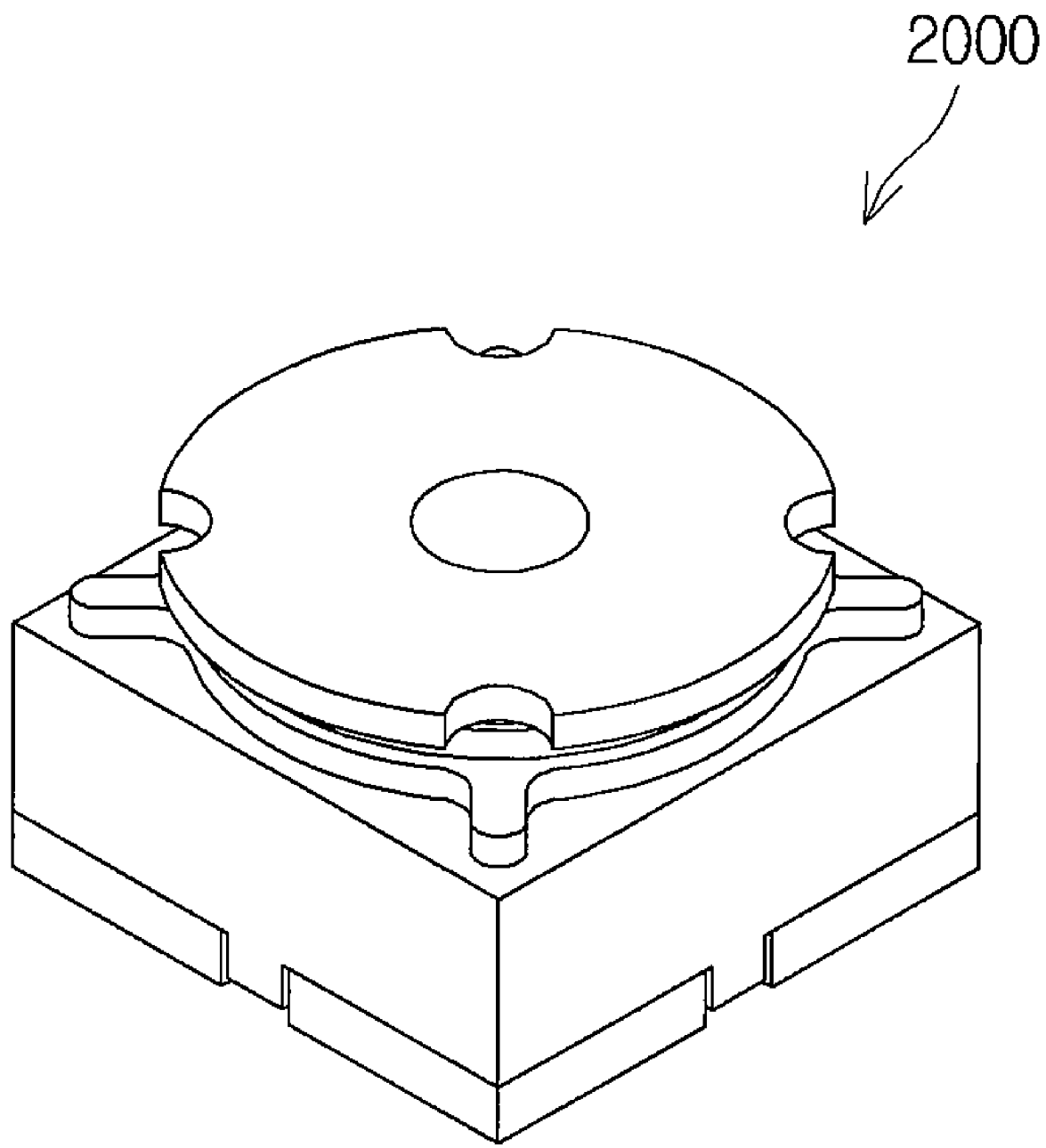
FIG. 7 is a perspective view of a camera module in accordance with another embodiment of the present invention.
Figure 8:
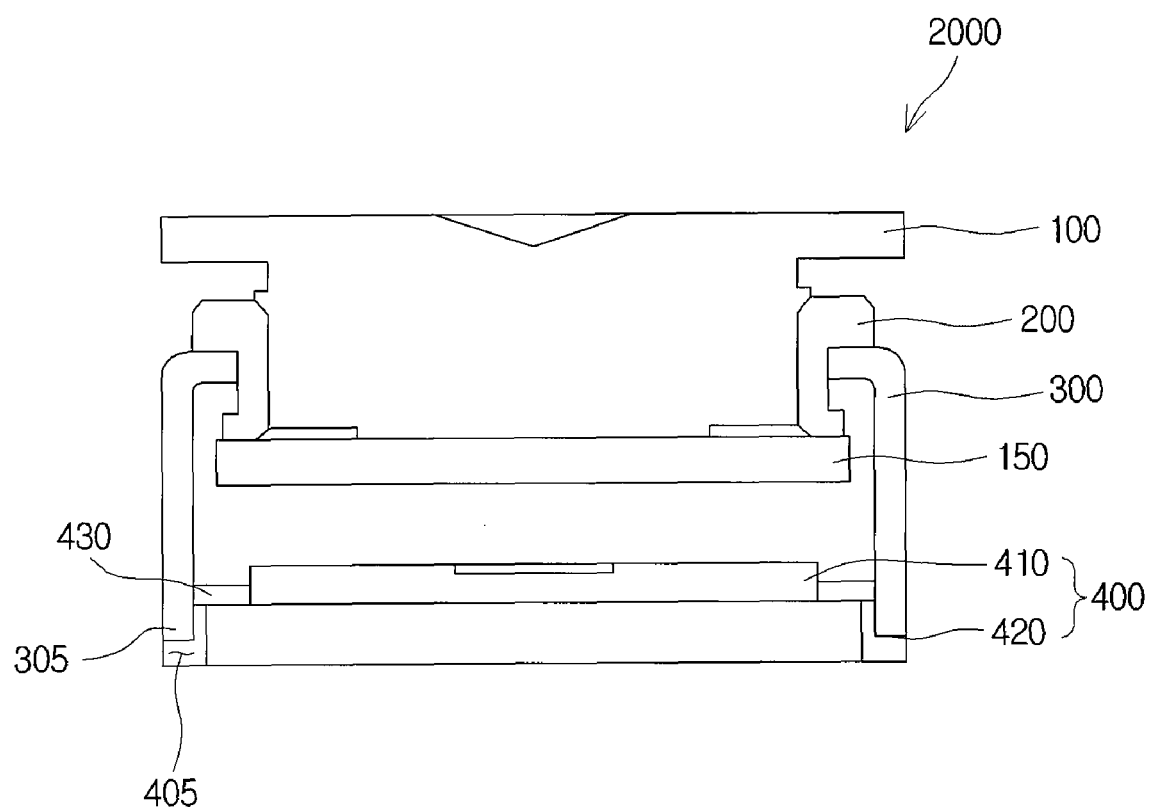
FIG. 8 is a cross-sectional view of a camera module in accordance with another embodiment of the present invention.
Figure 9:
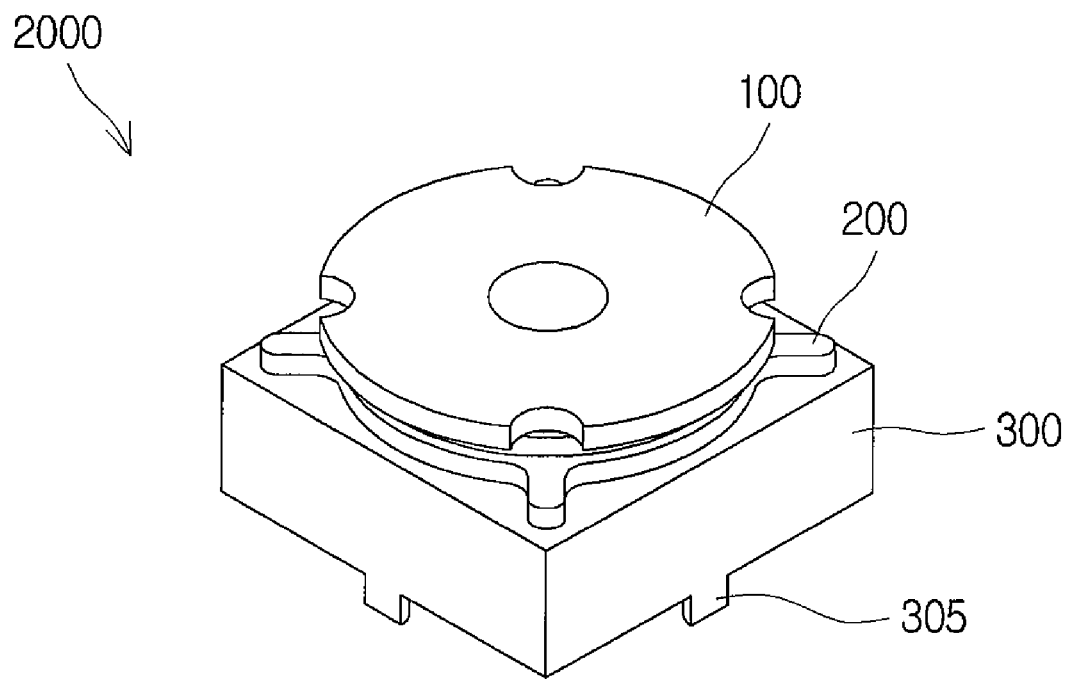
FIG. 9 is an exploded perspective view of a camera module in accordance with another embodiment of the present invention.
Figure 9:
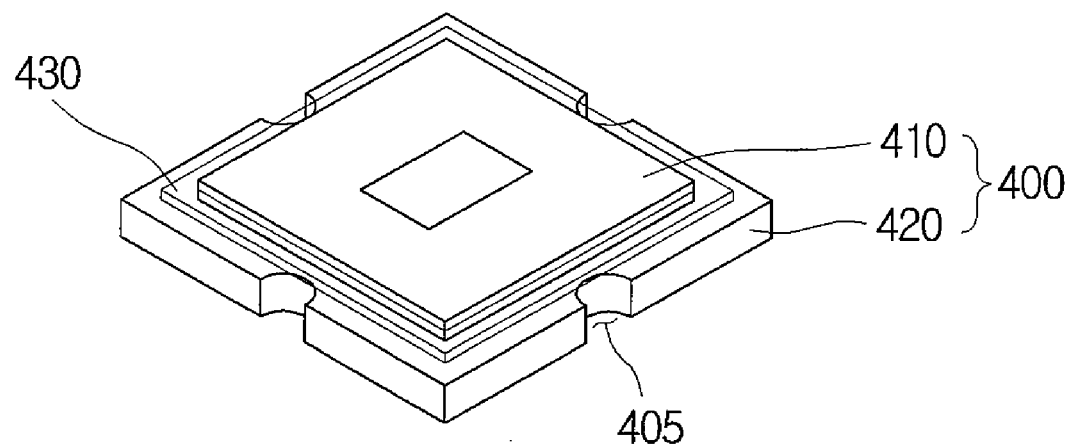

FIG. 7 is a perspective view of a camera module 2000 in accordance with another embodiment of the present invention, and FIG. 8 is a cross-sectional view of the camera module 2000 in accordance with another embodiment of the present invention. As illustrated in FIGS. 7 and 8, the camera module 2000 of the present embodiment can include a fixing protrusion 305 and a fixing indentation 405, which are coupled to each other. FIG. 9 is an exploded perspective view of the camera module 2000 in accordance with another embodiment of the present invention. As illustrated in FIG. 9, the image sensor 410 can be mounted on the substrate 420, and a solder cream 430 can be coated on the edge of the image sensor 410 and the substrate 420.

The fixing protrusion 305 can be formed at a lower end part of the shield can 300, and the fixing indentation 405 can be formed at the edge of the substrate 420 in accordance with the position of the fixing protrusion 305.

Accordingly, when coupling an assembly of the lens unit 100, the housing 200, the filter unit 150 and the shield can 300 over the image sensing unit 400, the fixing protrusion 305 can be inserted into the fixing indentation 405, and then the solder cream 430 can be heated. Thus, not only can the assembly and the substrate 420 be coupled to each other structurally, but they can also be coupled to each other electrically.

Therefore, since the shield can 300 can be electrically grounded to the substrate 420, the electromagnetic wave shielding efficiency of the shield can 300 can be better improved.

Figure 10:
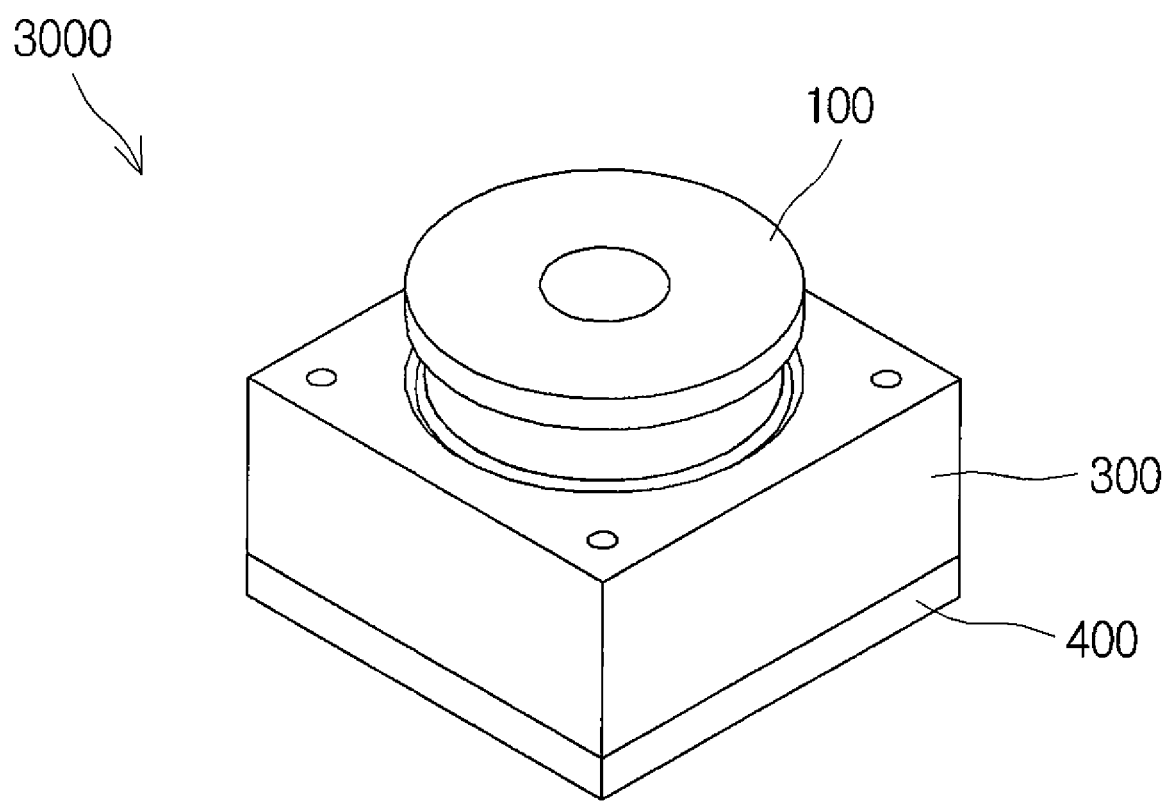
FIG. 10 is a perspective view of a camera module in accordance with yet another embodiment of the present invention.
Figure 11:
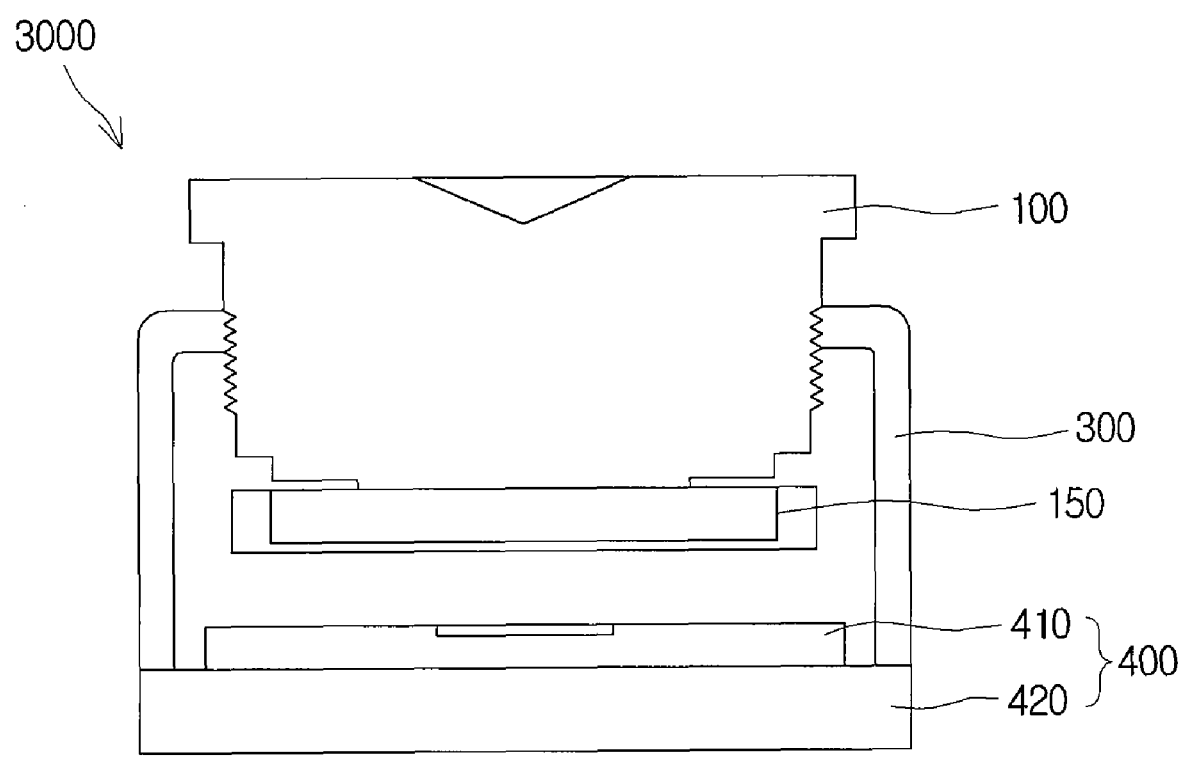
FIG. 11 is a cross-sectional view of a camera module in accordance with yet another embodiment of the present invention.

FIG. 10 is a perspective view of a camera module 3000 in accordance with yet another embodiment of the present invention, and FIG. 11 is a cross-sectional view of the camera module 3000 in accordance with yet another embodiment of the present invention. As illustrated in FIGS. 10 and 11, the camera module 3000 of the present embodiment can omit the housing 200 described above.

A thread can be formed on the outer circumferential surface of the lens unit 100 and the inner circumferential surface of the through-hole in the upper surface of the shield can 300, and thus the threaded lens unit 100 can be screwed to the threaded shield can 300.

Here, the filter unit 150 can be coupled to a lower surface of the lens unit 100. It is also possible that the filter unit 150 can be directly coupled to the inner surfaces of the shield can 300.

Accordingly, the shield can 300 of the camera module 3000 of the present embodiment can directly support the lens unit 100 over the substrate 410 and completely cover the image sensing unit 400. Thus, a thinner camera module 3000 can be provided, and the electromagnetic wave shielding efficiency of the shield can 300 can be better improved.

Like the previously described embodiments of the present invention, the shield can 300 of the present embodiment can be grounded to the substrate 410, and thus the electromagnetic wave shielding efficiency of the shield can 300 can be better improved.

By utilizing certain embodiments of the present invention as set forth above, a smaller camera module can be implemented.

While the spirit of the present invention has been described in detail with reference to particular embodiments, the embodiments are for illustrative purposes only and shall not limit the present invention. It is to be appreciated that those skilled in the art can change or modify the embodiments without departing from the scope and spirit of the present invention.

What is claimed is:

1. A camera module comprising:
   a lens unit;
   an image sensing unit configured to convert light received through the lens unit to an electrical signal, the image sensing unit comprises an image sensor configured to convert light received through the lens unit to an electrical signal and a substrate having the image sensor mounted thereon;
   a housing supporting the lens unit; and
   a shield can supporting a lower side of the housing and made of a conductive metallic material so as to shield an electromagnetic wave,
   wherein a downwardly-protruded fixing protrusion is formed on a lower surface of the shield can, and a fixing indentation is formed in the substrate, the fixing protrusion being inserted into the fixing indentation.

2. The camera module of claim 1, wherein the shield can covers the image sensing unit.

3. The camera module of claim 1, further comprising a filter unit interposed between the lens unit and the image sensing unit so as to shield infrared light.

4. The camera module of claim 1, wherein the shield can is grounded to the substrate.

* * * * *